United States Patent [19]

Schatteman

[11] Patent Number: 4,546,396
[45] Date of Patent: Oct. 8, 1985

[54] LOADING AND UNLOADING SYSTEM FOR RECORDING AND/OR PLAYBACK APPARATUS

[75] Inventor: Etienne A. Schatteman, Wemmel, Belgium

[73] Assignee: Staar, S. A., Belgium

[21] Appl. No.: 437,189

[22] Filed: Oct. 27, 1982

[30] Foreign Application Priority Data

Nov. 9, 1981 [BE] Belgium .............................. 0/206482
Apr. 23, 1982 [BE] Belgium .............................. 0/207911

[51] Int. Cl.[4] ...................... G11B 15/00; G11B 17/00
[52] U.S. Cl. ...................................... 360/96.5; 360/97
[58] Field of Search ...................... 360/93, 96.1, 96.5, 360/97, 99; 242/197–201

[56] References Cited

U.S. PATENT DOCUMENTS

| 3,936,011 | 2/1976 | Staar | 242/198 |
| 4,021,005 | 5/1977 | Takemoto et al. | 242/198 |
| 4,099,213 | 7/1978 | Schatteman | 360/137 |
| 4,208,023 | 6/1980 | Demol | 242/198 |
| 4,295,169 | 10/1981 | Iwata et al. | 360/96.5 X |

Primary Examiner—John H. Wolff
Attorney, Agent, or Firm—Leydig, Voit & Mayer, Ltd.

[57] ABSTRACT

The disclosure describes a mechanism for loading and unloading cassettes or discs comprising a main frame, spaced side plates fixed on the main frame and having inverted L slots, and a movable frame between these side plates providing a magazine for a cassette or disc. The mechanism further comprises lateral members on the movable frame engaged in the inverted L slots and movable side plates associated with the fixed side plates and mounted on the main frame for rectilinear movement. The movable side plates have inclined slots which receive the lateral members. Further, the mechanism comprises a structure such as a rack and gear arrangement which interconnects the movable side plates for movement in unison. The inclined slots in the movable side plates act to guide the lateral members and the movable frame in a path defined by the inverted L slots between ejected and operating positions of the cassette or disc.

12 Claims, 9 Drawing Figures

LOADING AND UNLOADING SYSTEM FOR RECORDING AND/OR PLAYBACK APPARATUS

TECHNICAL FIELD

The present invention relates to mechanisms for loading and unloading cassettes of recording tape or discs in recording and/or playback apparatus. More particularly, this invention relates to mechanisms of the type in which cassettes or discs are loaded and unloaded by a combination of in-and-out horizontal movement and vertical movement to cooperate with drive elements for the cassette tape or disc.

DISCLOSURE OF INVENTION

The main object of this invention is to provide such a mechanism having an improved arrangement for guiding a magazine for the cassette or disc during its insertion, its movement to operating position and its ejection.

A related object is to provide such a mechanism having a movable frame supported by side plates which are interconnected for movement in unison and act to guide the movable frame smoothly and precisely to position a cassette or disc into and out of engagement with drive and playback elements.

Another object is to provide such a mechanism which is capable of being operated either manually or under power for loading or unloading a cassette or disc in recording and/or playback apparatus.

BRIEF DESCRIPTION OF DRAWINGS

Further objects will become apparent from the following description taken in conjunction with the accompanying drawings in which.

BEST MODE FOR CARRYING OUT THE INVENTION

Figure 2:
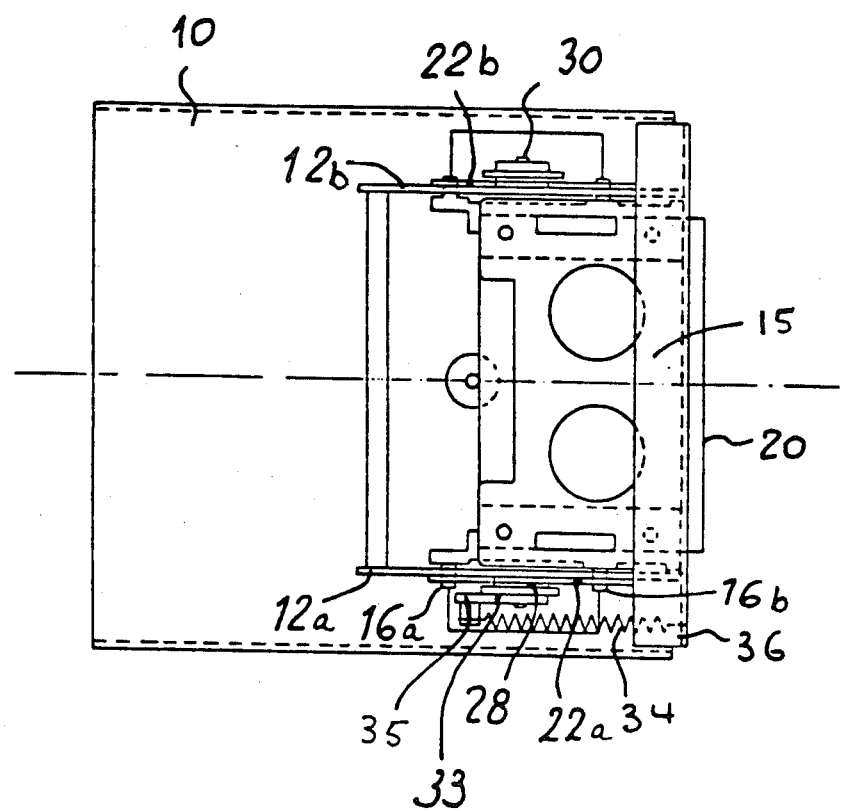
FIG. 2 is a plan view of the mechanism of FIGS. 1A, 1B and 1C with portions omitted for clarity.

Referring to FIG. 2, a main frame 10 is provided for supporting drive and/or playback elements (not shown) for the magnetic tape within a cassette 20. The cassette 20 is carried within a magazine on a movable frame 15 into operating position wherein it cooperates with the drive and/or playback elements. The magazine and cassette are movable in an L-shaped path involving horizontal in-and-out movement and vertical movement, as indicated by the arrow in FIG. 3.

For the purpose of supporting the movable frame 15 on the main frame 10, a pair of spaced fixed side plates 12a, 12b are mounted on the main frame 10 and slots 14a, 14b having the shape of an inverted L are provided in these side plates 12a, 12b. The movable frame 15 is supported between the side plates 12a, 12b and has a pair of laterally extending studs or members 16a, 16b which penetrate the slots 14a, 14b in the side plates and allow the movable frame and magazine to move horizontally and vertically in its L-shaped path to load by positioning the cassette on the drive and playback elements for the magnetic tape within the cassette and to unload the cassette.

In accordance with the invention, to guide the lateral members 16a, 16b and the movable frame 15 during loading and unloading, a movable side plate 22a, 22b is provided adjacent each fixed side plate 12a, 12b and such movable plates are interconnected for movement in unison. To interconnect the movable plates 22a, 22b, each plate is provided on its lower edge with a rack 26 which is engaged by a gear 28 supported on a common rotating shaft 30 journalled in the frame 10.

Each of the movable side plates 22a, 22b is also provided with two slots 24a, 24b which are inclined and parallel and receive the members 16a, 16b of the movable frame 15. The members 16a, 16b pass through the inverted L slots 14a, 14b in the side plates 12a, 12b. The movable plates 22a, 22b are constrained to in-and-out rectilinear movement on the main frame 10 by the fixed pin 31 which extends through a horizontal slot 32 in the movable plates 22a, 22b and are interconnected with one another for movement in unison. The slots 24a, 24b are inclined and parallel and engage with the lateral members 16a, 16b of the movable frame 15 so as to link the movement of the movable frame in its L-shaped path with the in-and-out movement of the movable plates 22a, 22b. Accordingly, to load the cassette 20, the movable plates 22a, 22b are displaced inwardly by the inward movement of the cassette 20 and, therefore, of the movable frame 15 as the cassette is moved inwardly and then downwardly to engage the drive and playback elements. The inclined slots 24a, 24b in the movable plates 22a, 22b intersect the L-shaped slots 14a, 14b in the fixed plates 12a, 12b and provide a common opening for the lateral members 16a, 16b to pass through; the combination of these slotted plates serves to maintain the magazine on the movable frame 15 and the cassette therein precisely in its desired horizontal plane as it moves both inwardly and downwardly to operating position.

Figure 3:
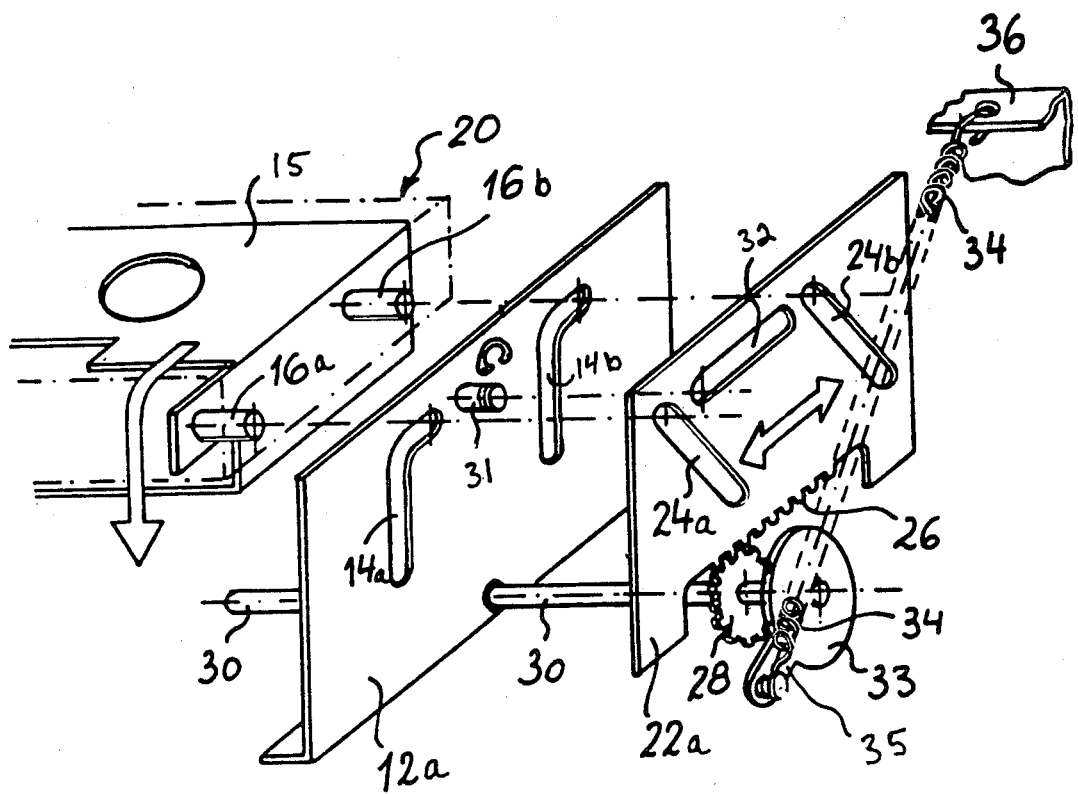
FIG. 3 is a partial exploded perspective view of the mechanism of FIG. 2.

Further in keeping with the invention, provision is made for storing energy to move the movable frame 15 and magazine in the return direction and eject the cassette 20. To this end, an eccentric plate 33 is mounted on one of the gears 28, as shown in FIG. 3, and a return spring 34 is connected between an arm 35 on the plate 33 and a lug 36 on the fixed frame 10. As the gear 28 rotates in the course of inward movement of the movable frame 15 from the fully ejected position of the cassette 20 (FIG. 1A), the gear 28 and eccentric plate 33 rotate counterclockwise to the position of FIG. 1B. The tension force of the spring 34 acting through the arm 35 is then utilized as a source of power to rotate the gear 28 further counterclockwise and via the racks 26, move the side plates 22a, 22b inward, causing the movable frame 15 and magazine to be cammed downwardly by the action of the inclined slots 24a, 24b on the lateral members 16a, 16b to position the cassette in the operating position of FIG. 1C. To return the movable frame 15 and eject the cassette 20, the gear 28 is rotated clockwise in order to bring the arm 35 and the spring 34 over center, either by acting mechanically on the gear by means of a motor supplying power (not shown) or manually. After being carried over center, the arm 35 and eccentric plate 33 are turned in a clockwise direction by the force of the spring 34 which supplies power to return the movable frame 15 and magazine and eject the cassette 20.

Figure 1A:
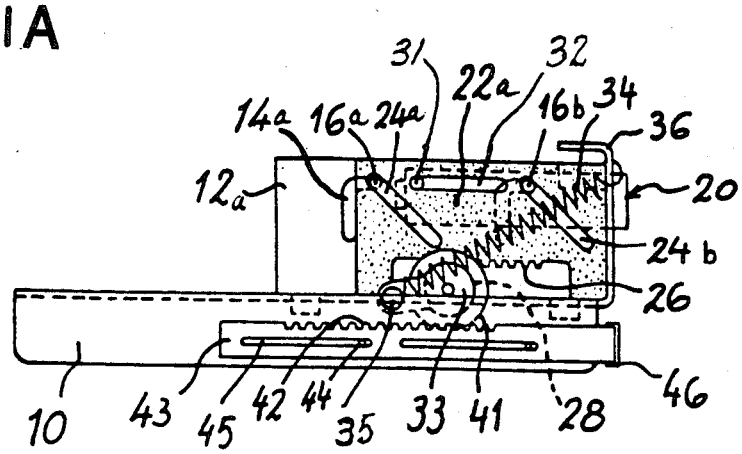
FIGS. 1A, 1B and 1C are stopped motion, side views of a mechanism for cassettes constructed according to the invention.
Figure 1B:
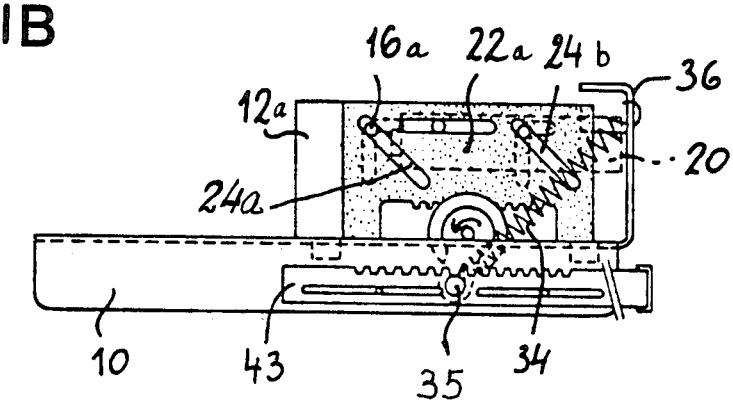
Figure 1C:
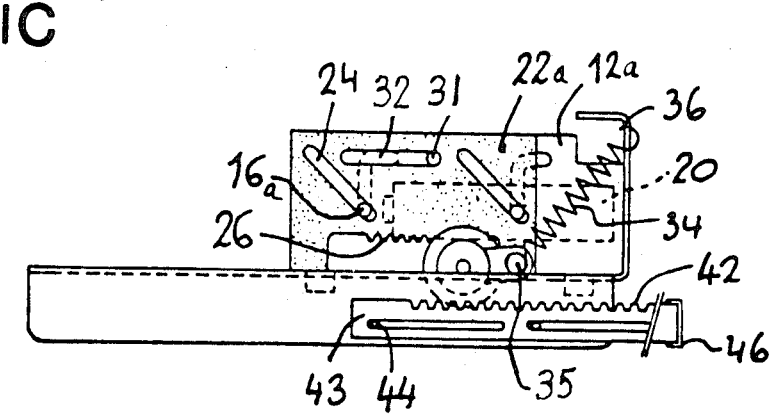

A means for rotating the arm 35 the requisite rotational distance clockwise is herein shown as a second gear 41 (FIGS. 1A, 1B, 1C) rigid with the gear 28 and engaging with a rack 42 formed on a slide 43. These parts are shown in FIGS. 1A–1C but are omitted for purposes of clarity from FIGS. 2 and 3. The slide 43 is actuated by a push button 46, the movement of which is guided by lugs 44 fixed to the main frame 10 and engaging in slots 45.

It will be noted that the inclined slots 24a, 24b provided in the movable side plates 22a, 22b preferably have projected lengths in both horizontal and vertical planes greater than the lengths of the horizontal and vertical legs of the path defined by the inverted L slots 14a, 14b so as to allow the movable frame 15 to position the cassette completely in its operating position.

Figure 5:
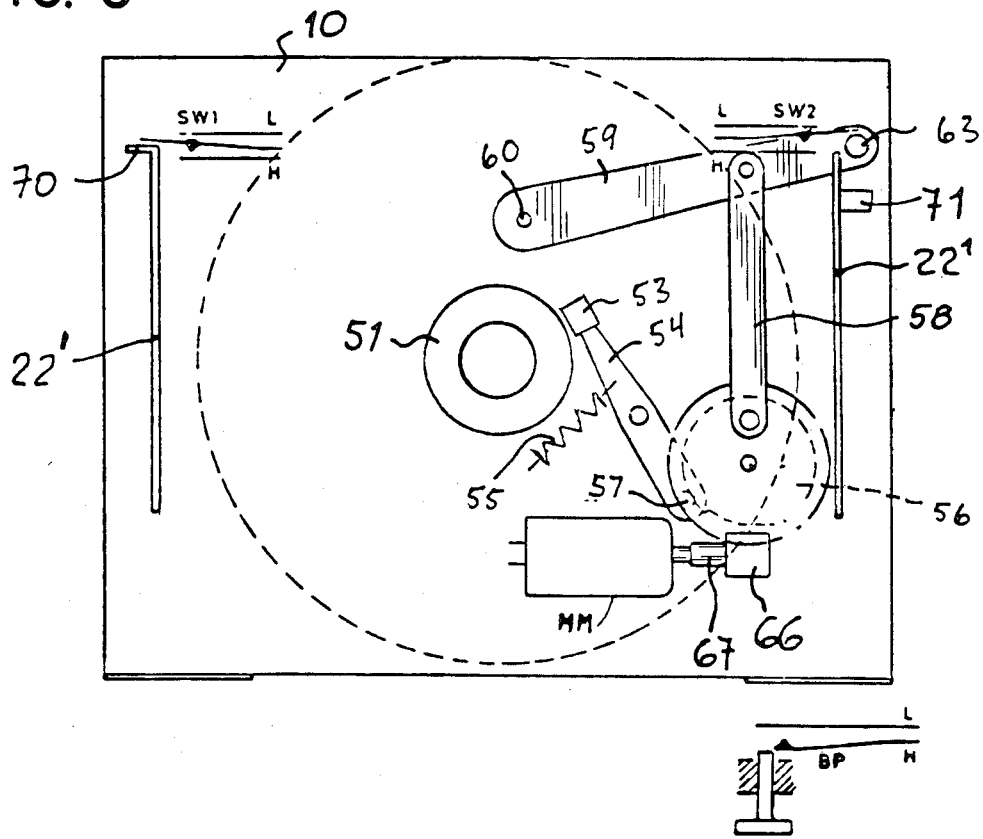
FIG. 5 is a plan view from below of the mechanism of FIG. 4 with a disc in operating position.
Figure 6:
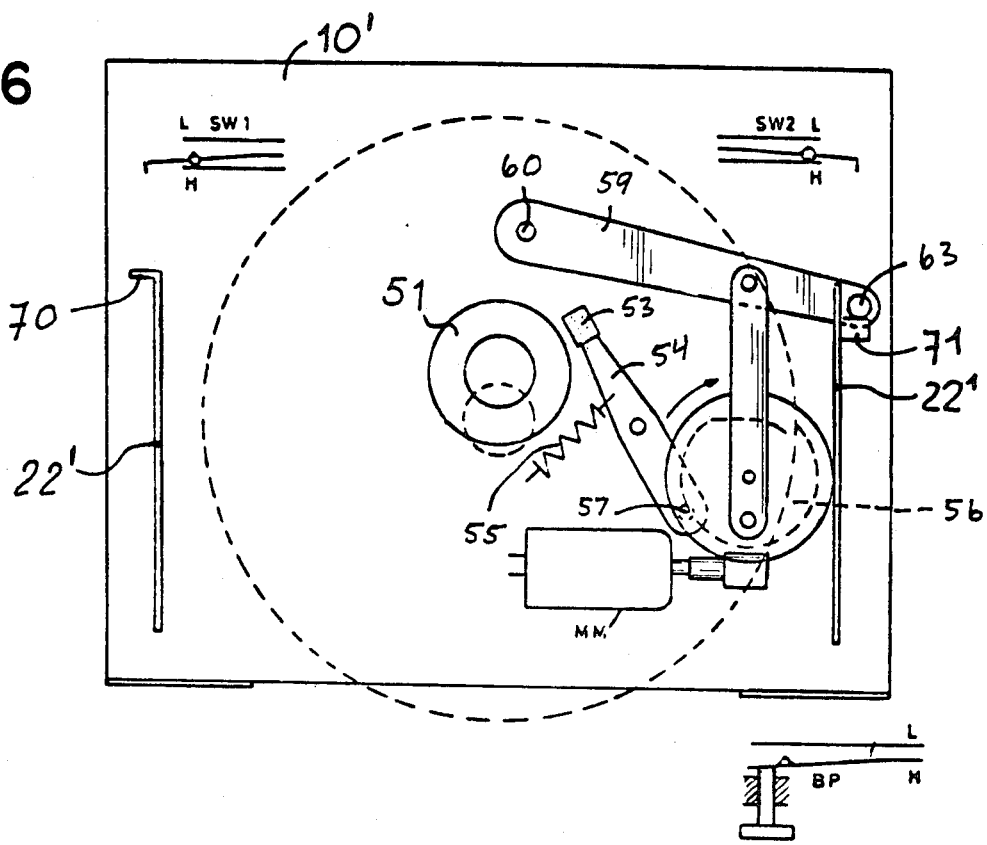
FIG. 6 is a plan view similar to FIG. 5 with a disc in partly ejected position.
Figure 7:
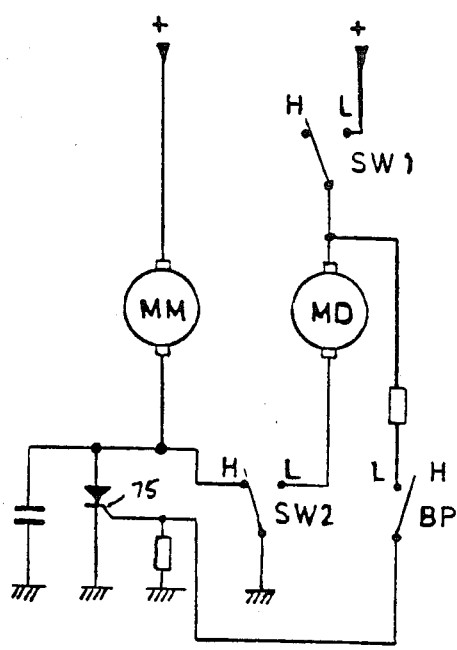
FIG. 7 is a diagram of an electrical circuit for the mechanism of FIGS. 4-6.

Now turning to FIGS. 4–7, another embodiment of the invention is illustrated for carrying a disc 50 to operating position on a rotary hub 51 driven by a motor MD (FIG. 7).

Similar to the embodiment of FIGS. 1–3, a pair of spaced fixed side plates 12' are mounted on a frame 10' parallel to one another and are provided with slots having the shape of an inverted L, as illustrated in FIGS. 1A–1C. Between the fixed side plates 12', a movable frame 52 is provided with movable side plates 22' adjacent each of the fixed plates 12' in which there are provided parallel inclined slots, as illustrated in FIGS. 1A–1C. As in the first example of the invention illustrated in FIGS. 1–3, the movable frame 52 is movable along an L shaped path from a fully ejected position of the disc 50 to its operating position, in this case on the rotary hub 51. To support the movable frame 52, laterally extending members 16 penetrate and cooperate with the L-shaped slots in the fixed plates 12' and the inclined slots in the movable side plates 22' so that the movable frame 52 and the disc 50 move horizontally and then vertically for positioning of the disc 50 on the rotary hub 51. Also in the same manner as described in connection with the first example of the invention, the movable plates 22' are interconnected for movement in unison through means such as racks and gears mounted on a common shaft.

Further in keeping with the invention, means are provided for braking the rotary hub 51 prior to ejection of the disc 50. For braking the hub 51, as shown in FIGS. 5 and 6, a brake shoe 53 on the end of a lever 54 is movable into engagement with the rotary hub 51 to frictionally engage and brake the rotation of the hub. The lever 54 is urged by a spring 55 toward the braking position and is controlled by a rotary cam 56 which engages a stud 57 on the end of the lever 54 opposite from the brake shoe 53.

In addition to controlling the braking of the rotary hub 51, the rotary cam 56 is also effective to control the operating cycle of the mechanism by operating the switch SW2 via the arm 58, which is connected to a lever 59 pivotable about a spindle 60 supported on the main frame 10'.

Figure 4:
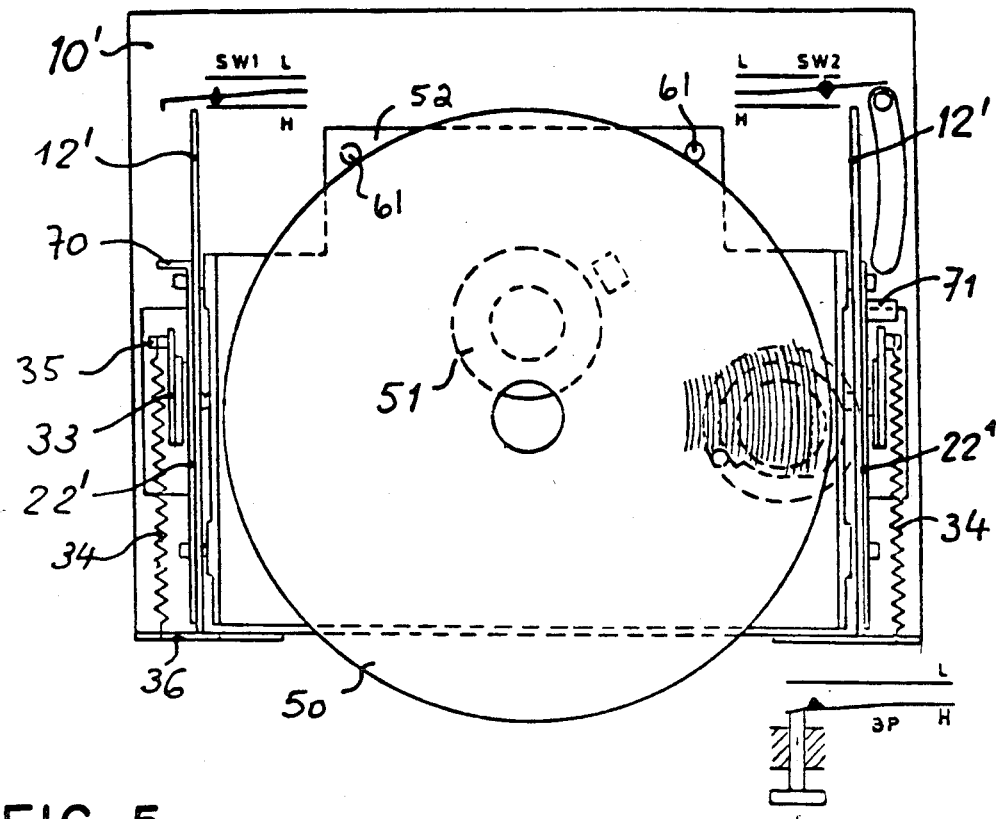
FIG. 4 is a plan view of a mechanism for discs constructed according to the invention and illustrating a disc in its fully ejected position.

Referring to FIG. 4, in the rest or fully ejected position of the disc 50 a further control switch SW1 is located in the position H and the switch SW2 is in the position L (FIG. 7). As the disc 50 is inserted, it engages studs 61 on the movable frame 52 which displaces the movable side plates 22' horizontally inwardly, causing the movable frame 52 to move inwardly and downwardly to lower the disc 50 onto the rotary hub 51. One of the movable plates 22' is also provided with a laterally extending tongue 70 which acts to move the switch SW1 from the position H to the position L (FIGS. 5 and 7). With the switch SW2 initially in the L position, the drive motor MD will be energized and the disc 50 caused to rotate.

In keeping with the invention, the ejection of the disc 50 is controlled by a push button BP (FIG. 7) which is movable from the position H to the position L. The SCR 75 is then triggered by a voltage from the + voltage source, which energizes the motor MM from the + voltage source and causes rotation in a clockwise direction of the cam 56. The profile of the cam 56 acts on the stud 57 of the lever 54 which, by the action of the spring 55, urges the brake shoe 53 against the rotary hub 51 of the motor MD so as to stop the rotational movement and immobilize the disc 50.

The rotary cam 56 also drives the lever 58 which insures the pivoting of the lever 59 about the spindle 60. This lever 59 acts via the stud 63 on a flange 71 supported by the movable plate 22' in order to insure its return movement as well as of the movable frame 52.

As a result of this movement, the movable frame 52 and the disc 50 are displaced vertically and then horizontally and thus the disc 50 is ejected from the apparatus. The switch SW2 being no longer subject to the action of the stud 63 is returned to the position H which energizes the motor MM. As shown in FIGS. 5 and 6, the motor MM is connected by shaft and gearing 66, 67 to the rotary cam 56.

Thus, the rotation of the rotary cam 56 first causes the rotary hub 51 to be braked via the lever 54 and then causes the ejection of the disc by the stroke of the lever 59 which engages and moves the movable side plates 22'. After the disc 50 has been ejected, the motor MM is still actuated (SW2 remains in position H) and the motor MM continues its rotation to insure a complete rotation of the cam 56. Alternatively, the cam may be caused to execute only one-half rotation in order to obtain an entirely automatic control of the disc insertion.

I claim:

1. Mechanism for loading and unloading cassettes or discs in recording and/or playback apparatus comprising:
    a main frame;
    spaced side plates fixed on said main frame having inverted L slots;
    a movable frame between said side plates providing a magazine for a cassette or disc;
    lateral members on said movable frame engaged in said inverted L slots;
    movable side plates associated with said fixed side plates and mounted on said main frame for rectilinear movement, said movable side plates having inclined slots receiving said lateral members; and
    means interconnecting said movable side plates for movement in unison, the inclined slots in said movable side plates acting to guide said lateral members and said movable frame in a path defined by said inverted L slots between ejected and operating positions of said cassette or disc.

2. Mechanism according to claim 1 wherein said means interconnecting said movable side plates includes racks on said movable side plates and gears engaged with said racks and mounted on a common shaft journalled in said main frame.

3. Mechanism according to claim 2 including an eccentric arm on said shaft and resilient means connected to said arm for rotating said shaft to move said movable frame in the unloading direction to eject a cassette or disc.

4. Mechanism according to claim 2 including an eccentric arm on said shaft and resilient means connected to said arm for rotating said shaft to move said movable frame in the loading direction to the operating position of the cassette or disc.

5. Mechanism according to claim 1, said inclined slots having projected lengths in both horizontal and vertical planes greater than the lengths of the horizontal and vertical legs of the path defined by said inverted L slots to allow said movable frame to attain the operating position of said cassette or disc.

6. Mechanism according to claim 1 including power operates means for shifting said movable side plates in unison for loading and unloading a cassette or disc.

7. Mechanism according to claim 1 for a recording and/or playback apparatus for a disc and including a rotary hub, said mechanism including a member for braking the rotation of said hub.

8. Mechanism according to claim 7 including a rotary cam means for operating said braking member to engage said hub prior to unloading a disc.

9. Mechanism according to claim 1 including a rotary cam member and means connecting said cam member to one of said movable side plates to move the latter to unload and eject a cassette.

10. Mechanism according to claim 7 including a rotary cam member and means connecting said cam member to one of said movable side plates to move the latter to unload and eject a cassette.

11. Mechanism according to claim 10 wherein said rotary cam member is connected to both said braking member and one of said movable side plates.

12. Mechanism according to claim 1 including a drive motor and a mechanism motor and switches for operating said motors coincident with the loading and unloading of a cassette for automatic operation.

* * * * *